United States Patent
Pan et al.

(10) Patent No.: US 10,619,707 B2
(45) Date of Patent: Apr. 14, 2020

(54) MULTI-MODE POWER SPLIT HYBRID TRANSMISSION WITH TWO PLANETARY GEAR MECHANISMS

(71) Applicant: The Regents of the University of Michigan, Ann Arbor, MI (US)

(72) Inventors: Ziheng Pan, Ann Arbor, MI (US); Huei Peng, Ann Arbor, MI (US); Shyam Jade, Farmington Hills, MI (US); Jason Schwanke, Southfield, MI (US); Matt Thorington, Farmington Hills, MI (US); Nikhil Ravi, Redwood City, CA (US); Viktor Rill, San Jose, CA (US)

(73) Assignees: THE REGENTS OF THE UNIVERSITY OF MICHIGAN, Ann Arbor, MI (US); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/140,645

(22) Filed: Sep. 25, 2018

(65) Prior Publication Data
US 2019/0093737 A1   Mar. 28, 2019

Related U.S. Application Data

(60) Provisional application No. 62/564,576, filed on Sep. 28, 2017.

(51) Int. Cl.
| | |
|---|---|
| *F16H 3/06* | (2006.01) |
| *F16H 3/00* | (2006.01) |
| *F16H 3/46* | (2006.01) |
| *B60K 6/42* | (2007.10) |

(52) U.S. Cl.
CPC ............ *F16H 3/006* (2013.01); *B60K 6/42* (2013.01); *F16H 3/001* (2013.01); *F16H 3/46* (2013.01); *F16H 2003/007* (2013.01); *F16H 2200/0021* (2013.01); *F16H 2200/2007* (2013.01);
(Continued)

(58) Field of Classification Search
CPC .......................................... F16H 3/46
See application file for complete search history.

(56) References Cited

U.S. PATENT DOCUMENTS

| | | |
|---|---|---|
| 2012/0178573 A1 | 7/2012 | Hart et al. |
| 2012/0316021 A1 | 12/2012 | Kim et al. |

(Continued)

FOREIGN PATENT DOCUMENTS

KR    100803533 B1    2/2008

OTHER PUBLICATIONS

International Search Report and Written Opinion of the International Searching Authority issued in PCT/2018/052970, dated Jan. 9, 2019.

*Primary Examiner* — Derek D Knight
(74) *Attorney, Agent, or Firm* — Harness, Dickey & Pierce, P.L.C.

(57) ABSTRACT

A multi-mode, power-split hybrid transmission system having two planetary gear (PG) sets connected to one engine, two electric motors, one output shaft, and each other by several clutches, brakes, and direct connection elements. Depending on the specific location and actuation of the various clutch and brake elements, the multi-mode, power-split hybrid transmission system can be run in one of several modes (e.g. electric drive, power-split, parallel hybrid, series hybrid, electronic continuously variable transmission (eCVT), generator, neutral, and the like).

10 Claims, 14 Drawing Sheets

(52) U.S. Cl.
CPC ............... *F16H 2200/2038* (2013.01); *F16H 2200/2041* (2013.01)

(56) References Cited

U.S. PATENT DOCUMENTS

2012/0322601 A1  12/2012  Kim et al.
2015/0024893 A1   1/2015  Lee et al.

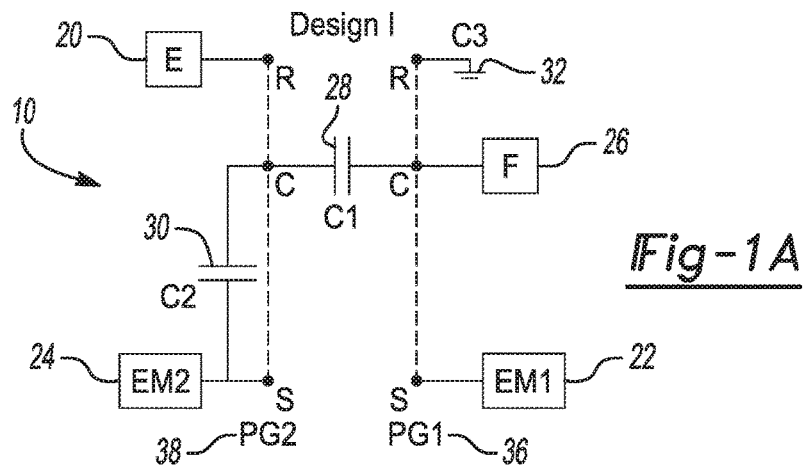
*Fig-1A*
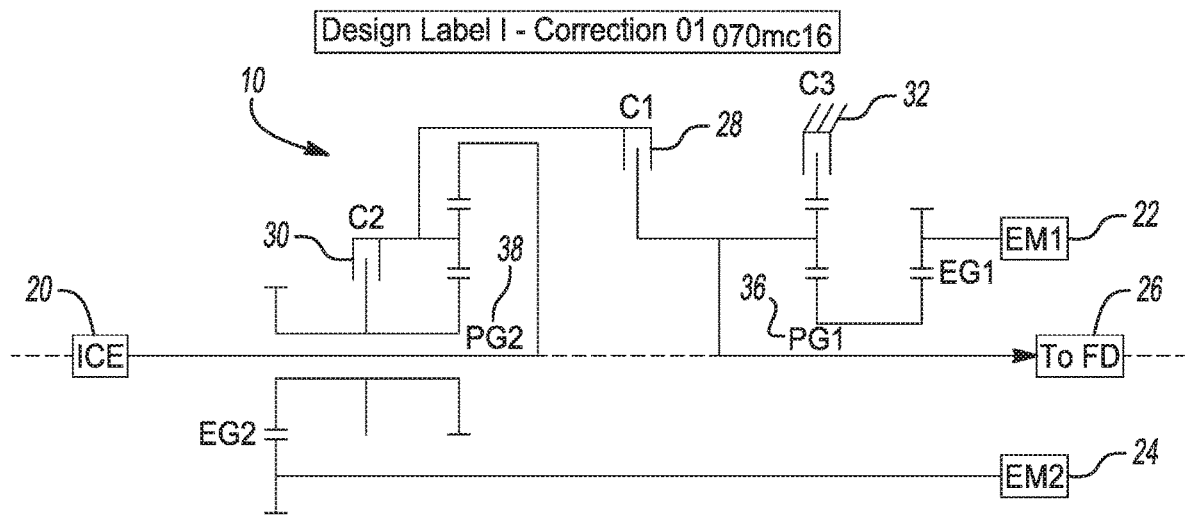
*Fig-1B*
| Mode # | C1 | C2 | C3 | Behavior |
|---|---|---|---|---|
| 1 | 0 | 0 | 0 | Neutral |
| 2 | 0 | 1 | 0 | Neutral, Charge Battery |
| 3 | 1 | 0 | 0 | ECVT Drive (E&EM2) |
| 4 | 1 | 1 | 0 | Parallel, Fixed Ratio (E&EM2) |
| 5 | 0 | 0 | 1 | EV Low Speed, Fixed Ratio (EM1) |
| 6 | 0 | 1 | 1 | Series, Fixed Ratio (EM1) |
| 7 | 1 | 0 | 1 | Power-Split |
| 8 | 1 | 1 | 1 | Parallel, Fixed Ratio (E&EM1&EM2) |
*Fig-2*

| Mode # | C1 | C2 | C3 | C4 | Behavior |
|---|---|---|---|---|---|
| 1 | 0 | 0 | 0 | 0 | Neutral |
| 2 | 0 | 1 | 0 | 0 | Neutral |
| 3 | 1 | 0 | 0 | 0 | Neutral |
| 4 | 1 | 1 | 0 | 0 | EV High Speed, Fixed Ratio (EM2) |
| 5 | 0 | 0 | 1 | 0 | EV Low Speed, Fixed Ratio (EM1) |
| 6 | 0 | 1 | 1 | 0 | EV Low Speed, Fixed Ratio (EM1) |
| 7 | 1 | 0 | 1 | 0 | EV Low Speed, Fixed Ratio (EM1) |
| 8 | 1 | 1 | 1 | 0 | EV Power, 2 Motors (EM1&EM2) |
| 9 | 0 | 0 | 0 | 1 | Neutral |
| 10 | 0 | 1 | 0 | 1 | Neutral, Charge Battery |
| 11 | 1 | 0 | 0 | 1 | ECVT Drive (E&EM1) |
| 12 | 1 | 1 | 0 | 1 | Parallel, Fixed Ratio (E&EM1) |
| 13 | 0 | 0 | 1 | 1 | EV Low Speed, Fixed Ratio (EM1) |
| 14 | 0 | 1 | 1 | 1 | Series, Fixed Ratio (EM1) |
| 15 | 1 | 0 | 1 | 1 | Power-Split |
| 16 | 1 | 1 | 1 | 1 | Parallel, Fixed Ratio (E&EM1&EM2) |

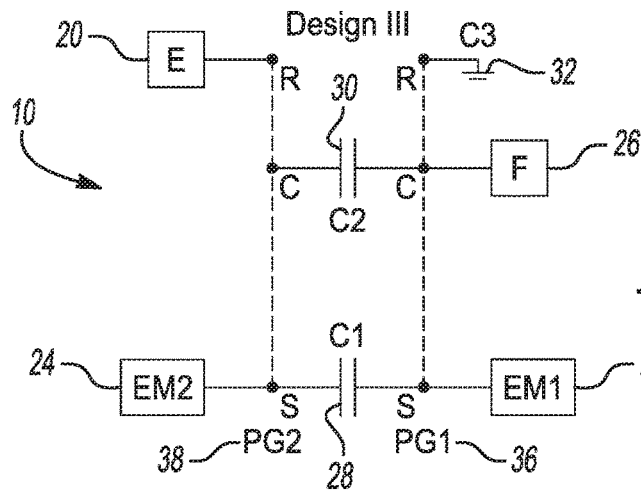
*Fig-6A*
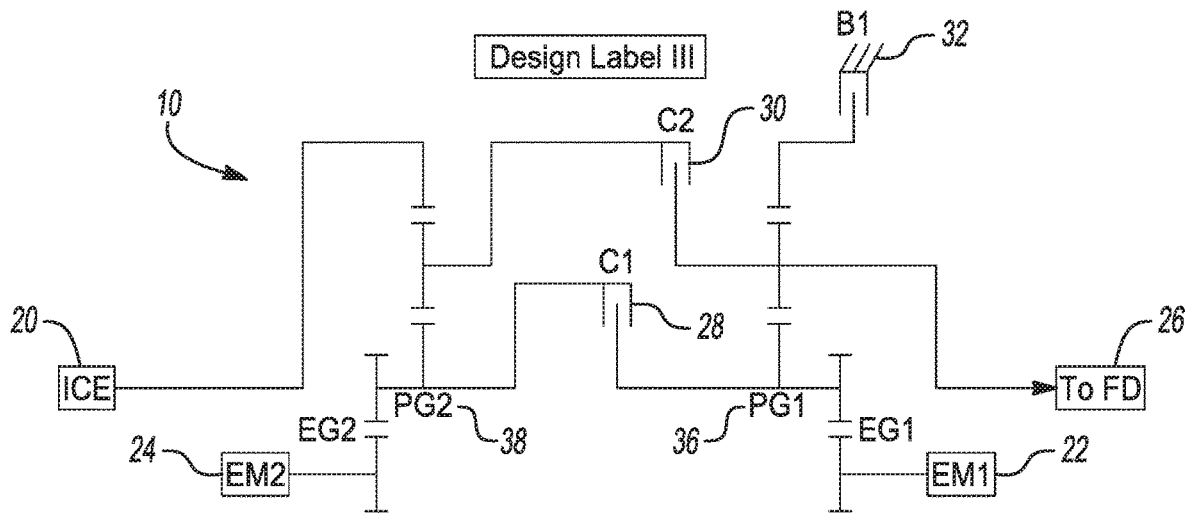
*Fig-6B*
| Mode # | C1 | C2 | C3 | Behavior |
|---|---|---|---|---|
| 1 | 0 | 0 | 0 | Neutral |
| 2 | 0 | 1 | 0 | ECVT Drive (E&EM2) |
| 3 | 1 | 0 | 0 | Neutral |
| 4 | 1 | 1 | 0 | ECVT Drive (E&EM1&EM2) |
| 5 | 0 | 0 | 1 | EV, Fixed Ratio (EM1) |
| 6 | 0 | 1 | 1 | Power-Split |
| 7 | 1 | 0 | 1 | EV, Fixed Ratio (EM1&EM2) |
| 8 | 1 | 1 | 1 | EV |
*Fig-7*

| Mode # | C1 | C2 | C3 | C4 | Behavior |
|---|---|---|---|---|---|
| 1 | 0 | 0 | 0 | 0 | Neutral |
| 2 | 0 | 1 | 0 | 0 | ECVT Drive (E&EM2) |
| 3 | 1 | 0 | 0 | 0 | Neutral |
| 4 | 1 | 1 | 0 | 0 | ECVT Drive (E&EM1&EM2) |
| 5 | 0 | 0 | 1 | 0 | EV, Fixed Ratio (EM1) |
| 6 | 0 | 1 | 1 | 0 | Power-Split |
| 7 | 1 | 0 | 1 | 0 | EV Power, 2 Motors (EM1&EM2) |
| 8 | 1 | 1 | 1 | 0 | EV (EM1&EM2) |
| 9 | 0 | 0 | 0 | 1 | Neutral, Charge Battery |
| 10 | 0 | 1 | 0 | 1 | Parking Brake |
| 11 | 1 | 0 | 0 | 1 | Neutral, Charge Battery |
| 12 | 1 | 1 | 0 | 1 | Parking Brake |
| 13 | 0 | 0 | 1 | 1 | Series Mode (EM1) |
| 14 | 0 | 1 | 1 | 1 | Parking Brake |
| 15 | 1 | 0 | 1 | 1 | Parallel, Fixed Ratio (E&EM1&EM2) |
| 16 | 1 | 1 | 1 | 1 | Parking Brake |

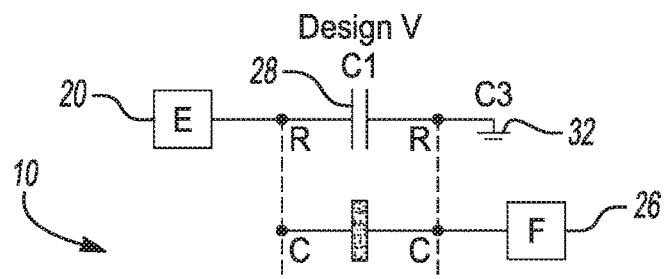
*Fig-11A*
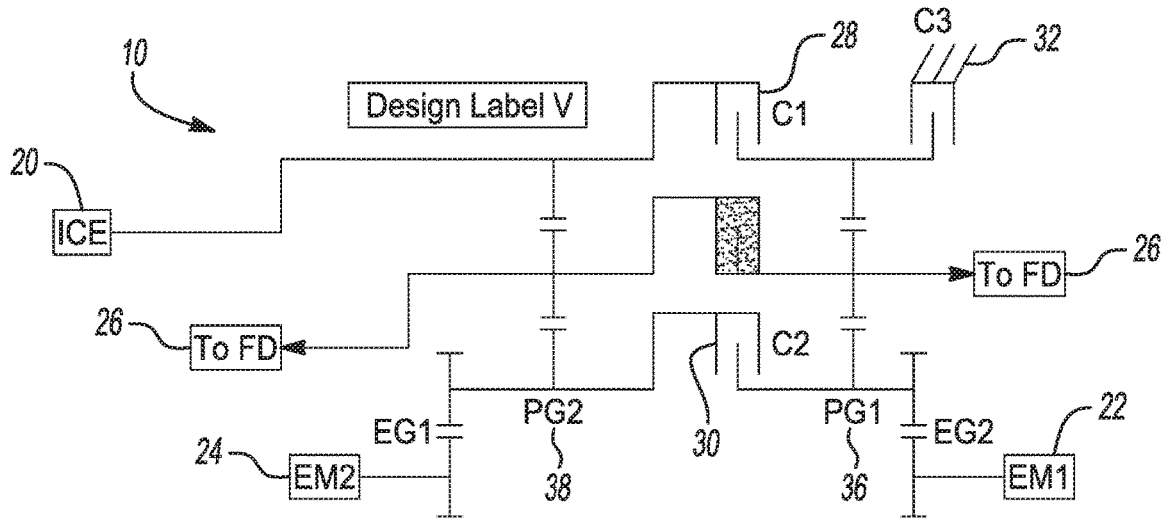
*Fig-11B*
| Mode # | C1 | C2 | C3 | Behavior |
|---|---|---|---|---|
| 1 | 0 | 0 | 0 | ECVT Drive (E&EM2) |
| 2 | 1 | 0 | 0 | ECVT Drive (E&EM1&EM2) |
| 3 | 0 | 1 | 0 | ECVT Drive (E&EM1&EM2) |
| 4 | 1 | 1 | 0 | N/A |
| 5 | 0 | 0 | 1 | Power-Split |
| 6 | 1 | 0 | 1 | EV, Fixed Ratio (EM1&EM2) |
| 7 | 0 | 1 | 1 | EV, Fixed Ratio (EM1&EM2) |
| 8 | 1 | 1 | 1 | N/A |
*Fig-12*

| Mode # | C1 | C2 | C3 | Behavior |
|---|---|---|---|---|
| 1 | 0 | 0 | 0 | ECVT Drive (E&EM2) |
| 2 | 0 | 1 | 0 | EV, Fixed Ratio (EM1) |
| 3 | 1 | 0 | 0 | ECVT Drive (E&EM1&EM2) |
| 4 | 1 | 1 | 0 | EV, Fixed Ratio (EM1&EM2) |
| 5 | 0 | 0 | 1 | Power-Split |
| 6 | 0 | 1 | 1 | EV, Fixed Ratio (EM1&EM2) |
| 7 | 1 | 0 | 1 | EV, Fixed Ratio (EM1&EM2) |
| 8 | 1 | 1 | 1 | N/A |

| Mode # | C1 | C2 | C3 | C4 | Behavior |
|---|---|---|---|---|---|
| 1 | 0 | 0 | 0 | 0 | Neutral |
| 2 | 1 | 0 | 0 | 0 | ECVT Drive (E&EM2) |
| 3 | 0 | 0 | 1 | 0 | EV Low Speed, Fixed Ratio (EM1) |
| 4 | 1 | 0 | 1 | 0 | Power-Split |
| 5 | 0 | 1 | 0 | 0 | Neutral |
| 6 | 1 | 1 | 0 | 0 | EV High Speed, Fixed Ratio (EM1) |
| 7 | 0 | 1 | 1 | 0 | EV Low Speed, Fixed Ratio (EM2) |
| 8 | 1 | 1 | 1 | 0 | EV Power, 2 Motors (EM1&EM2) |
| 9 | 0 | 0 | 0 | 1 | Neutral, Charge Battery |
| 10 | 1 | 0 | 0 | 1 | Parking Brake |
| 11 | 0 | 0 | 1 | 1 | Series Mode |
| 12 | 1 | 0 | 1 | 1 | Parking Brake |
| 13 | 0 | 1 | 0 | 1 | Neutral |
| 14 | 1 | 1 | 0 | 1 | Parking Brake |
| 15 | 0 | 1 | 1 | 1 | EV Low Speed, Fixed Ratio (EM1) |
| 16 | 1 | 1 | 1 | 1 | Parking Brake |

| Mode # | C1 | C2 | C3 | C4 | Behavior |
|---|---|---|---|---|---|
| 1 | 0 | 1 | 0 | 0 | Neutral |
| 2 | 0 | 0 | 0 | 1 | Neutral, Charge Battery |
| 3 | 1 | 0 | 0 | 0 | ECVT Drive (E&EM1) |
| 4 | 0 | 0 | 1 | 0 | EV Low, Fixed Ratio (EM2) |
| 5 | 0 | 1 | 0 | 1 | Neutral |
| 6 | 1 | 1 | 0 | 0 | EV High Speed, Fixed Ratio (EM1) |
| 7 | 0 | 1 | 1 | 0 | EV Low Speed, Fixed Ratio (EM2) |
| 8 | 1 | 0 | 0 | 1 | Parallel, Fixed Ratio (E&EM2) |
| 9 | 1 | 0 | 1 | 0 | Power-Split |
| 10 | 0 | 0 | 1 | 1 | Series Mode |
| 11 | 1 | 1 | 0 | 1 | Parking Brake |
| 12 | 1 | 0 | 1 | 1 | Parallel, Fixed Ratio (E&EM1&EM2) |
| 13 | 1 | 1 | 1 | 0 | EV Power, 2 Motors (EM1&EM2) |
| 14 | 0 | 1 | 1 | 1 | EV Low Speed, Fixed Ratio (EM2) |
| 15 | 1 | 1 | 1 | 1 | Parking Brake |
| 16 | 0 | 0 | 0 | 0 | Neutral |

| Mode # | C1 | C2 | C3 | Behavior |
|---|---|---|---|---|
| 1 | 0 | 0 | 0 | ECVT Drive (E&EM2) |
| 2 | 1 | 0 | 0 | ECVT Drive (E&EM1&EM2) |
| 3 | 0 | 1 | 0 | Parallel, Fixed Ratio (E&EM2) |
| 4 | 1 | 1 | 0 | Parallel, Fixed Ratio (E&EM1&EM2) |
| 5 | 0 | 0 | 1 | Power-Split |
| 6 | 1 | 0 | 1 | EV, Fixed Ratio (EM1&EM2) |
| 7 | 0 | 1 | 1 | Parallel, Fixed Ratio (E&EM1&EM2) |
| 8 | 1 | 1 | 1 | N/A |

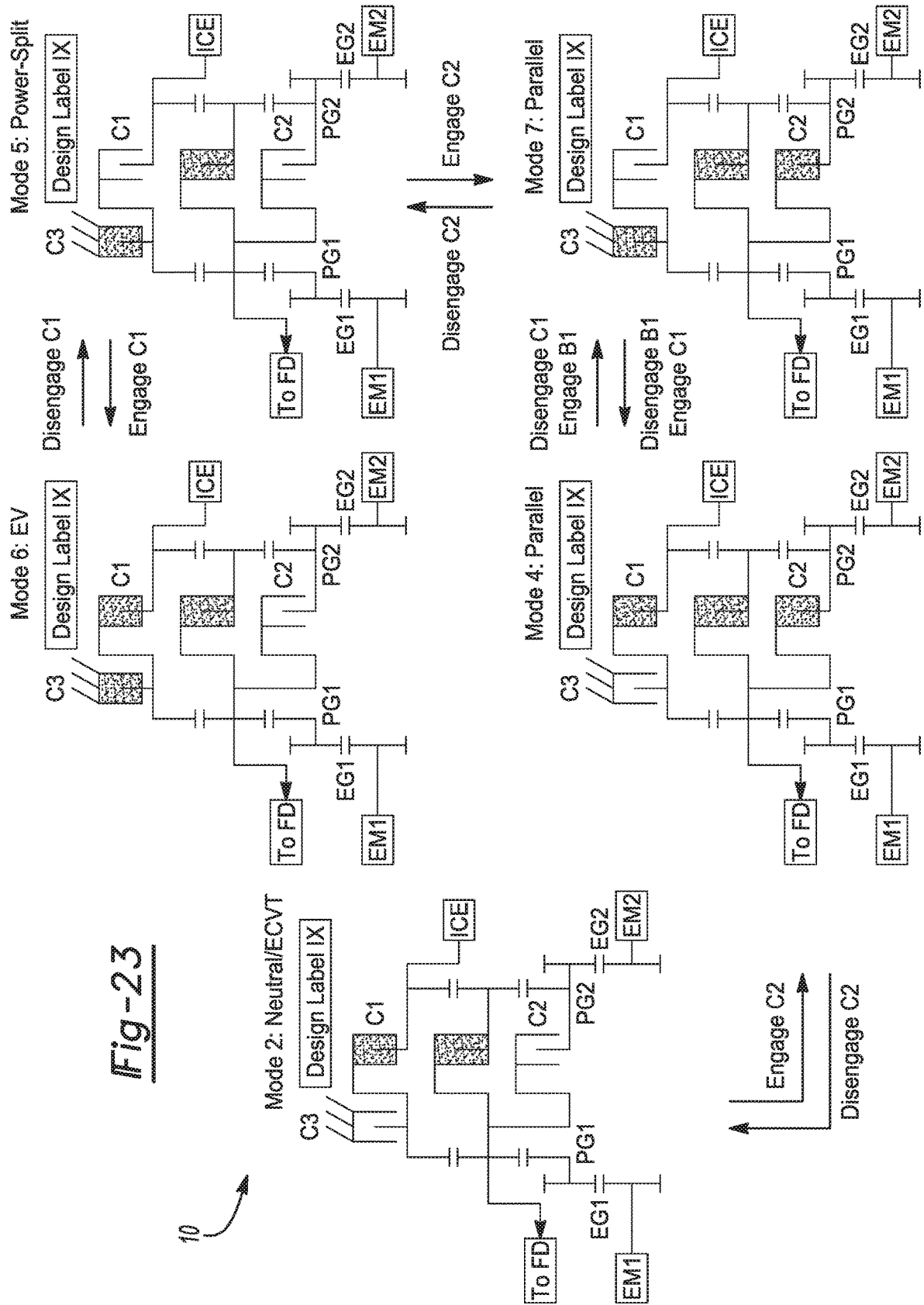

MULTI-MODE POWER SPLIT HYBRID TRANSMISSION WITH TWO PLANETARY GEAR MECHANISMS

CROSS-REFERENCE TO RELATED APPLICATIONS

This application claims the benefit of U.S. Provisional Application No. 62/564,576, filed on Sep. 28, 2017. The entire disclosure of the above application is incorporated herein by reference.

GOVERNMENT INTEREST

This invention was made with government support under DE-EE0007509, awarded by the U.S. Department of Energy. The Government has certain rights in the invention.

FIELD

The present disclosure relates to multi-mode, power-split hybrid transmission systems having two planetary gear mechanisms.

BACKGROUND AND SUMMARY

This section provides background information related to the present disclosure which is not necessarily prior art. This section also provides a general summary of the disclosure, and is not a comprehensive disclosure of its full scope or all of its features.

The present teachings provide a hybrid power split type transmission for a truck that achieves 50% fuel consumption reduction compared to current conventional models. The present teachings provide a transmission capable of delivering competitive performance while minimizing fuel consumption through power-split hybrid design.

In some embodiments, the transmission of the present invention consists of two planetary gear (PG) sets connected to one engine, two electric motors, one output shaft, and each other by several clutches, brakes, and direct connection elements. Depending on the specific location and actuation of the various clutch and brake elements, the entire powertrain can be run in one of several modes (e.g.: electric drive, power-split, parallel hybrid, series hybrid, electronic continuously variable transmission (eCVT), generator, neutral, etc.).

Acceleration and braking commands from the driver as understood in terms of driver demanded torque, and this torque demand is split among the drive elements (one engine and two electric motors) according to the specific mode the transmission is currently in. The transmission is to be configured and designed in such a way that the requested performance of the vehicle can be met while maintaining good fuel economy and respecting component limits. The chosen configurations are designed to satisfy or exceed the following targets: fuel efficiency, acceleration and transient performance, and control authority during mode switches.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 1A-1B are schematic diagrams of a multi-mode, power-split hybrid transmission system according to a first embodiment of the present disclosure (Design I);

FIG. 2 is a table illustrating the operating mode conditions for the first embodiment of the present disclosure;

FIGS. 6A-6B are schematic diagrams of a multi-mode, power-split hybrid transmission system according to a third embodiment of the present disclosure (Design III);

FIG. 7 is a table illustrating the operating mode conditions for the third embodiment of the present disclosure;

FIGS. 11A-11B are schematic diagrams of a multi-mode, power-split hybrid transmission system according to a fifth embodiment of the present disclosure (Design V);

FIG. 12 is a table illustrating the operating mode conditions for the fifth embodiment of the present disclosure;

FIGS. 21A-21B are schematic diagrams of a multi-mode, power-split hybrid transmission system according to a ninth embodiment of the present disclosure (Design IX);

FIG. 23 is an actuation schematic diagram of the multi-mode, power split hybrid transmission system of FIGS. 21A-21B.

Corresponding reference numerals indicate corresponding parts throughout the several views of the drawings.

DETAILED DESCRIPTION

Figure 3:
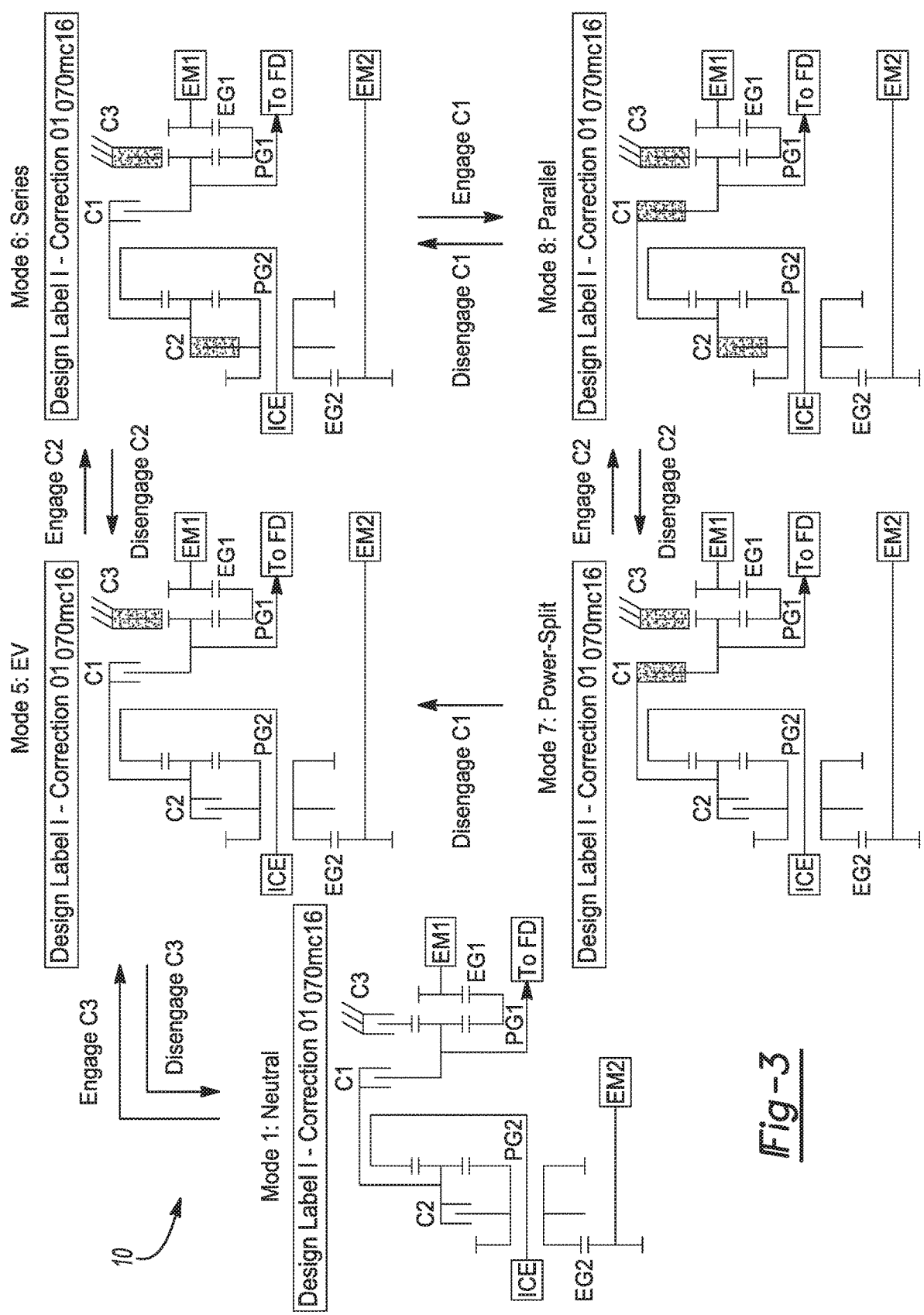
FIG. 3 is an actuation schematic diagram of the multi-mode, power-split hybrid transmission system of FIGS. 1A-1B.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

According to the principles of the present teachings, as outlined herein, a multi-mode, power-split hybrid transmission system 10 is provided having an internal combustion engine (E, ICE) 20, a first electric motor (M, EM1) 22, a second electric motor or generator (G, EM2) 24, an output shaft or final drive (F, FD) 26, a first clutch element (C1) 28, a second clutch element (C2) 30, a third brake/clutch element (C3) 32, a fourth brake/clutch element (C4) 34, a first planetary gear mechanism (PG1) 36, and a second planetary gear mechanism (PG2) 38.

As will be appreciated from the following, the figures of the present disclosure illustrate the multi-mode, power-split hybrid transmission system 10 and, particularly, the operational constructions of how the engine 20, two electric motors 22, 24, and the final drive output shaft 26 are connected to the suns, carriers, and rings of the two planetary gear mechanisms 36, 38. The figures further illustrate the active elements (brake/clutches 28, 30, 32, 34) between the suns, carriers, and rings of the two planetary gear mechanisms 36, 38. Each embodiment is illustrated in two different visual styles.

The multi-mode, power-split hybrid transmission system 10 of the present teachings may have various operating modes, including, but not limited to, power-split mode, pure electric mode, parallel hybrid mode, series hybrid mode, electronic continuously variable transmission (eCVT) mode, generator mode, neutral mode, and the like. Its operation can be optimized based on different environments.

It should be understood that the multi-mode, power-split hybrid transmission system 10 is particularly adapted to be incorporated and used in trucks or other vehicle. Various combinations of the active elements (clutches and brakes) can be actuated to set the two planetary gear mechanism transmission in specific modes. This is shown for each embodiment in the mode selection table associated therewith.

Description of a First Exemplary Embodiment
(Configuration A-Design I)

In some embodiments, as illustrated in FIG. 1, multi-mode, power-split hybrid transmission system 10 comprises the engine 20 operably connected to the ring gear of the second planetary gear mechanism 38, while first electric motor 22 is connected to the sun gear of the first planetary gear mechanism 36 and second electric motor 24 is connected to the sun gear of the second planetary gear mechanism 38.

The first clutch element (C1) 28 collocates with the carrier of the first planetary gear mechanism 36 and the carrier of the second planetary gear mechanism 38. The second clutch element (C2) 30 collocates with the carrier of the second planetary gear mechanism 38 and the sun gear of the second planetary gear mechanism 38. The third clutch/brake element (C3) 32 collocates with the ring gear of the first planetary gear mechanism 36. The carrier of the first planetary gear mechanism 36 outputs to the final drive 26.

In some embodiments, as illustrated in FIG. 2, multi-mode, power-split hybrid transmission system 10 employs different operating modes that can be selected by engaging or disengaging clutches of first clutch element (C1) 28 and second clutch element (C2) 30, and third brake/clutch element (C3) 32. As can be seen, the operating modes available in Design 94 are neutral, neutral/charge battery, eCVT (electronic continuously variable transmission), parallel hybrid, EV (electric vehicle), series hybrid, and power-split (FIG. 2).

The present teaching employs a neutral mode if first clutch element (C1) 28, second clutch element (C2) 30, and third brake/clutch element (C3) 32 are disengaged. The present teaching employs a neutral/charge battery mode if first clutch element (C1) 28 and third brake/clutch element (C3) 32 are disengaged, and second clutch element (C2) 30 is engaged. The present teaching employs an eCVT mode if second clutch element (C2) 30 and third brake/clutch element (C3) 32 are disengaged, and first clutch element (C1) 28 is engaged. The present teaching employs a fixed ratio parallel mode if first clutch element (C1) 28 and second clutch element (C2) 30 are engaged, and third brake/clutch element (C3) 32 is disengaged. The present teaching employs an EV fixed ratio mode if first clutch element (C1) 28 and second clutch element (C2) 30 are disengaged, and third brake/clutch element (C3) 32 is engaged. The present teaching employs a fixed ratio series mode if second clutch element (C2) 30 and third brake/clutch element (C3) 32 are engaged, and first clutch element (C1) 28 is disengaged. The present teaching employs a power-split mode if first clutch element (C1) 28 and third brake/clutch element (C3) 32 are engaged, and second clutch element (C2) 30 is disengaged. Finally, the present teaching employs a fixed ratio, parallel motor and generator mode if first clutch element (C1) 28, second clutch element (C2) 30, and third brake/clutch element (C3) 32 are engaged.

In some embodiments, as illustrated in FIG. 3, the particular operating mode can be selected through the actuation of one or more of the first clutch element (C1) 28, second clutch element (C2) 30, and third brake/clutch element (C3) 32. The actuation paths are illustrated in FIG. 3. The desired operating mode will be selected by a supervisory controller that balances fuel economy, performance, and drivability.

Description of a Second Exemplary Embodiment
(Configuration B-Design II)

Figures 4, 5:
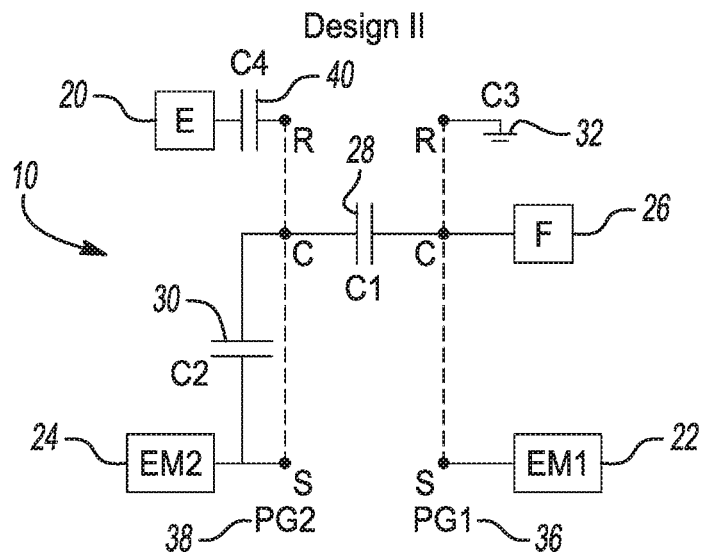
FIG. 4 is a schematic diagram of a multi-mode, power-split hybrid transmission system according to a second embodiment of the present disclosure (Design II)
FIG. 5 is a table illustrating the operating mode conditions for the second embodiment of the present disclosure.

In some embodiments, as illustrated in FIG. 4, multi-mode, power-split hybrid transmission system 10 can further comprise a fourth clutch element (C4) 40 operably coupled between the engine 20 and the ring gear of second planetary gear mechanism 38. This embodiment can be operated in various modes as illustrated in FIG. 5. That is, the present embodiment employs different operating modes that can be selected by engaging or disengaging first clutch element (C1) 28, second clutch element (C2) 30 and third clutch element (C3) 40, third brake/clutch element (C3) 32, and fourth clutch element (C4) 40. Operating modes 9-16 of FIG. 5 illustrate modes in which fourth clutch element (C4) 40 is engaged and, thus, are the same as operating modes 1-8 of FIG. 2. As can be seen, the operating modes available in the present embodiment (Design II) are neutral, parking brake, eCVT, parallel hybrid, series hybrid, EV (low speed, high speed, and power), and power-split (FIG. 5).

Description of a Third Exemplary Embodiment
(Configuration C-Design III)

In some embodiments, as illustrated in FIG. 6, multi-mode, power-split hybrid transmission system 10 comprises the engine 20 operably connected to the ring gear of the second planetary gear mechanism 38, while first electric motor 22 is operably connected to the sun gear of the first planetary gear mechanism 36 and second electric motor 24 is connected to the sun gear of the second planetary gear mechanism 38.

The first clutch element (C1) 28 collocates with the sun gear of the first planetary gear mechanism 36 and the sun gear of the second planetary gear mechanism 38. The second clutch element (C2) 30 collocates with the carrier of the first planetary gear mechanism 36 and the carrier of the second planetary gear mechanism 38. Third brake/clutch element (C3) 32 collocates with the ring gear of the first planetary gear mechanism 36. The carrier of the first planetary gear mechanism 36 outputs to the final drive 26.

In some embodiments, as illustrated in FIG. 7, multi-mode, power-split hybrid transmission system 10 employs different operating modes that can be selected by engaging or disengaging clutches of first clutch element (C1) 28 and second clutch element (C2) 30, and third brake/clutch element (C3) 32. As can be seen, the operating modes available in Design III are neutral, neutral/charge battery, eCVT (electronic continuously variable transmission), parallel hybrid, EV (electric vehicle), and power-split (FIG. 7).

The present teaching employs a neutral mode if first clutch element (C1) 28, second clutch element (C2) 30, and third brake/clutch element (C3) 32 are disengaged. The present teaching employs an eCVT drive (E&EM2) mode if first clutch element (C1) 28 and third brake/clutch element (C3) 32 are disengaged, and second clutch element (C2) 30 is engaged. The present teaching employs a neutral mode if second clutch element (C2) 30 and third brake/clutch element (C3) 32 are disengaged, and first clutch element (C1) 28 is engaged. The present teaching employs an eCVT drive (E&EM1&EM2) mode if first clutch element (C1) 28 and second clutch element (C2) 30 are engaged, and third brake/clutch element (C3) 32 is disengaged. The present teaching employs an EV fixed ratio mode if first clutch element (C1) 28 and second clutch element (C2) 30 are disengaged, and third brake/clutch element (C3) 32 is engaged. The present teaching employs a power-split mode if second clutch element (C2) 30 and third brake/clutch element (C3) 32 are engaged, and first clutch element (C1) 28 is disengaged. The present teaching employs a fixed ratio EV (EM1&EM2) mode if first brake element (B1) 32 and third brake/clutch element (C3) 32 are engaged, and second clutch element (C2) 30 is disengaged. Finally, the present teaching employs an EV mode if first clutch element (C1) 28, second clutch element (C2) 30, and third brake/clutch element (C3) 32 are engaged.

Figure 8:
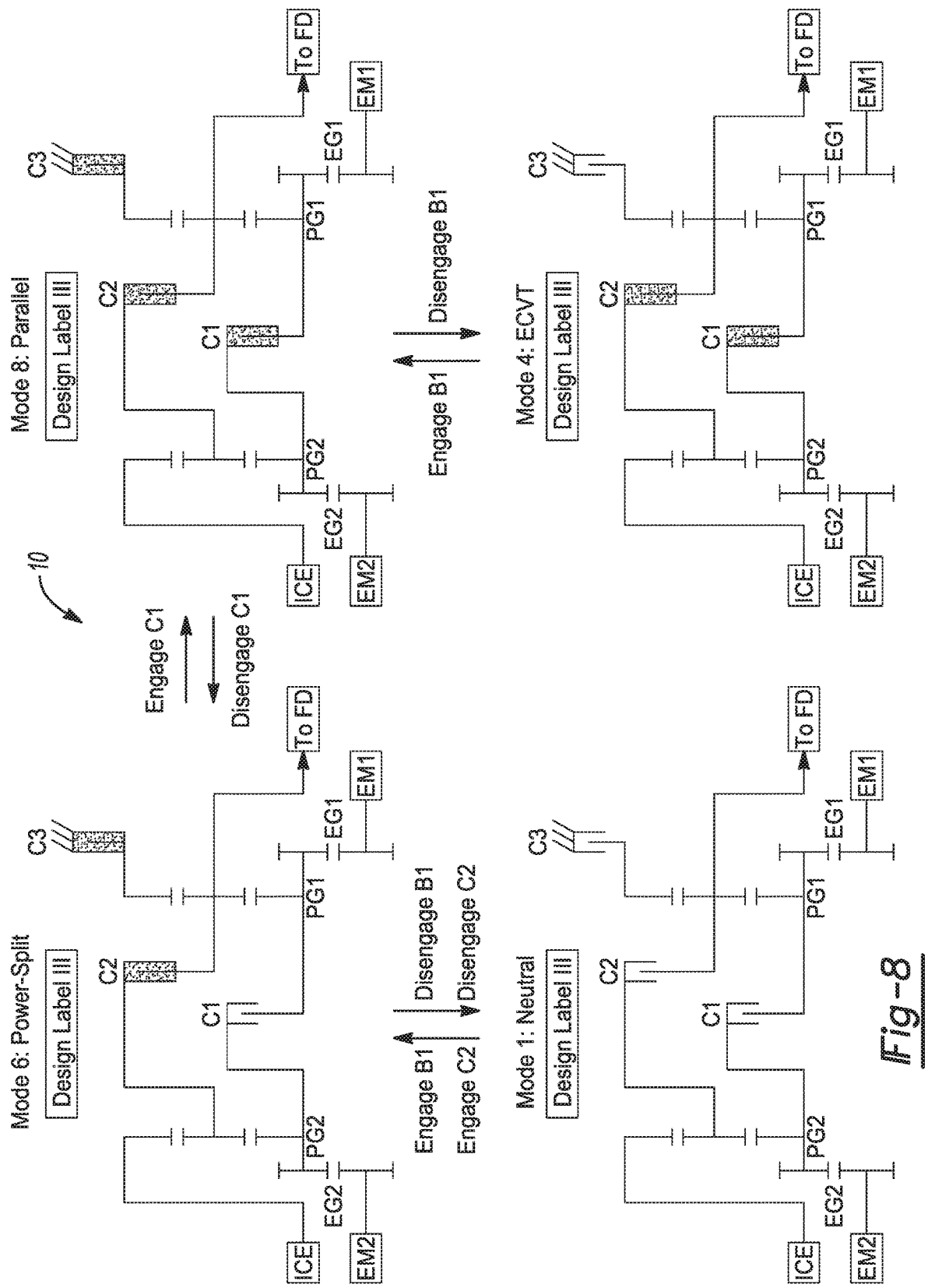
FIG. 8 is an actuation schematic diagram of the multi-mode, power-split hybrid transmission system of FIGS. 6A-6B.

In some embodiments, as illustrated in FIG. 8, the particular operating mode can be selected through the actuation of one or more of the first clutch element (C1) 28, second clutch element (C2) 30, and third brake/clutch element (C3) 32. The actuation paths are illustrated in FIG. 8. The desired operating mode will be selected by a supervisory controller that balances fuel economy, performance, and drivability.

Description of a Fourth Exemplary Embodiment
(Configuration D-Design IV)

Figures 9, 10:
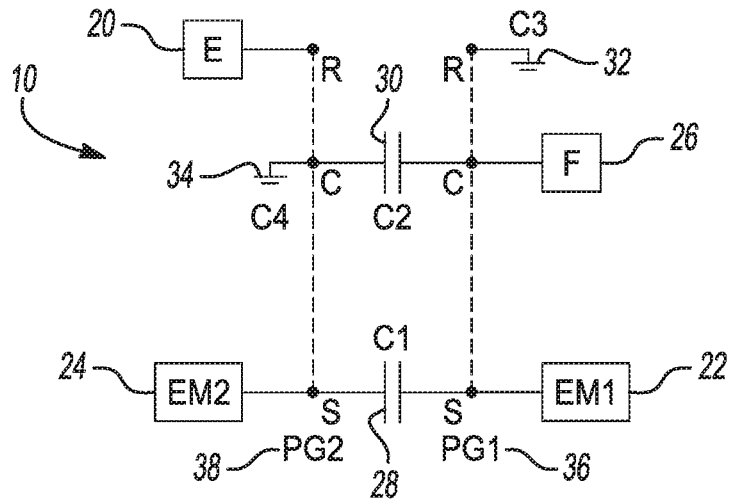
FIG. 9 is a schematic diagram of a multi-mode, power-split hybrid transmission system according to a fourth embodiment of the present disclosure (Design IV)
FIG. 10 is a table illustrating the operating mode conditions for the fourth embodiment of the present disclosure.

In some embodiments, as illustrated in FIG. 9, multi-mode, power-split hybrid transmission system 10 can further comprise a fourth brake/clutch element (C4) 34 operably coupled to the carrier of second planetary gear mechanism 38. This embodiment can be operated in various modes as illustrated in FIG. 10. That is, the present embodiment employs different operating modes that can be selected by engaging or disengaging first clutch element (C1) 28, second clutch element (C2) 30, third brake/clutch element (C3) 32 and fourth brake/clutch element (C4) 34. Operating modes 9-16 of FIG. 10 illustrate modes in which fourth brake/clutch (C4) 34 is engaged and, thus, are the same as operating modes 1-8 of FIG. 7. As can be seen, the operating modes available in the present embodiment (Design IV) are neutral, parking brake, eCVT, parallel hybrid, series hybrid, EV (low speed, high speed, and power), and power-split (FIG. 10).

Description of a Fifth Exemplary Embodiment
(Configuration E-Design V)

In some embodiments, as illustrated in FIGS. 11A-11B, multi-mode, power-split hybrid transmission system 10 comprises the engine 20 operably connected to the ring gear of the second planetary gear mechanism 38, while first electric motor 22 is operably connected to the sun gear of the first planetary gear mechanism 36 and second electric motor 24 is operably connected to the sun gear of the second planetary gear mechanism 38.

The first clutch element (C1) 28 collocates with the ring gear of the first planetary gear mechanism 36 and the ring gear of the second planetary gear mechanism 38. The second clutch element (C2) 30 collocates with the sun gear of the first planetary gear mechanism 36 and the sun gear of the second planetary gear mechanism 38. Third brake/clutch element (C3) 32 collocates with the ring gear of the first planetary gear mechanism 36. The carrier of the first planetary gear mechanism 36 is permanently coupled to the carrier of the second planetary gear mechanism 38. The carrier of the first planetary gear mechanism 36 outputs to the final drive 26.

In some embodiments, as illustrated in FIG. 12, multi-mode, power-split hybrid transmission system 10 employs different operating modes that can be selected by engaging or disengaging clutches of first clutch element (C1) 28 and second clutch element (C2) 30, and third brake/clutch element (C3) 32. As can be seen, the operating modes available in Design V are eCVT, EV, and power-split (FIG. 12).

The present teaching employs an eCVT drive (E&M) mode if first clutch element (C1) 28, second clutch element (C2) 30, and third brake/clutch element (C3) 32 are disengaged. The present teaching employs an eCVT drive (E&EM1&EM2) mode if second clutch element (C2) 30 and third brake/clutch element (C3) 32 are disengaged, and first clutch element (C1) 28 is engaged. The present teaching employs an eCVT drive (E&EM1&EM2) mode if first clutch element (C1) 28 and third brake/clutch element (C3) 32 are disengaged, and second clutch element (C2) 30 is engaged. The present teaching employs a power split mode if first clutch element (C1) 28 and second clutch element (C2) 30 are disengaged, and third brake/clutch element (C3) 32 is engaged. The present teaching employs an EV fixed ratio mode if first clutch element (C1) 28 and third brake/clutch element (C3) 32 are engaged, and second clutch element (C2) 30 is disengaged. The present teaching employs another EV fixed ratio mode if second clutch element (C2) 30 and third brake/clutch element (C3) 32 are engaged, and first clutch element (C1) 28 is disengaged.

Figure 13:
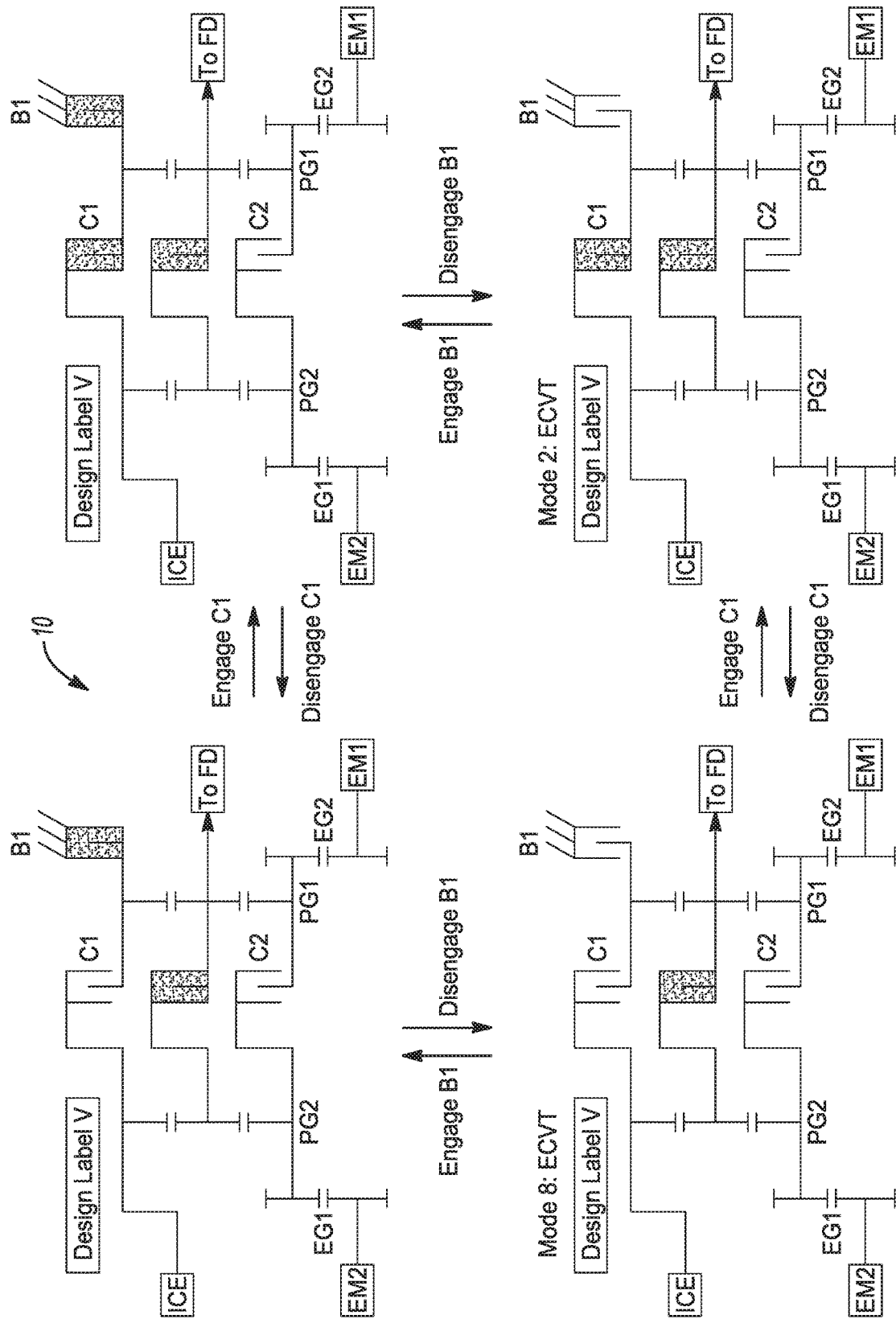
FIG. 13 is an actuation schematic diagram of the multi-mode, power-split hybrid transmission system of FIGS. 11A-11B.

In some embodiments, as illustrated in FIG. 13, the particular operating mode can be selected through the actuation of one or more of the first clutch element (C1) 28, second clutch element (C2) 30, and the third brake/clutch element (C3) 32. The actuation paths are illustrated in FIG. 13. The desired operating mode will be selected by a supervisory controller that balances fuel economy, performance, and drivability.

Description of a Sixth Exemplary Embodiment
(Configuration E-Design VI)

In some embodiments, as illustrated in FIG. 14, multi-mode, power-split hybrid transmission system 10 comprises the engine 20 operably connected to the ring gear of the second planetary gear mechanism 38, while first electric motor 22 is connected to the sun gear of the first planetary gear mechanism 36 and second electric motor 24 is connected to the sun gear of the second planetary gear mechanism 38.

The first clutch element (C1) 28 collocates with the sun gear of the first planetary gear mechanism 36 and the sun gear of the second planetary gear mechanism 38. Third brake/clutch element (C3) 34 collocates with the ring gear of the first planetary gear mechanism 36. Second brake/clutch element (C2) 32 collocates with the ring gear of the second planetary gear mechanism 38. The carrier of the first planetary gear mechanism 36 is permanently coupled to the carrier of the second planetary gear mechanism 38. The carrier of the first planetary gear mechanism 36 outputs to the final drive 26.

Figures 14A, 14B, 15:
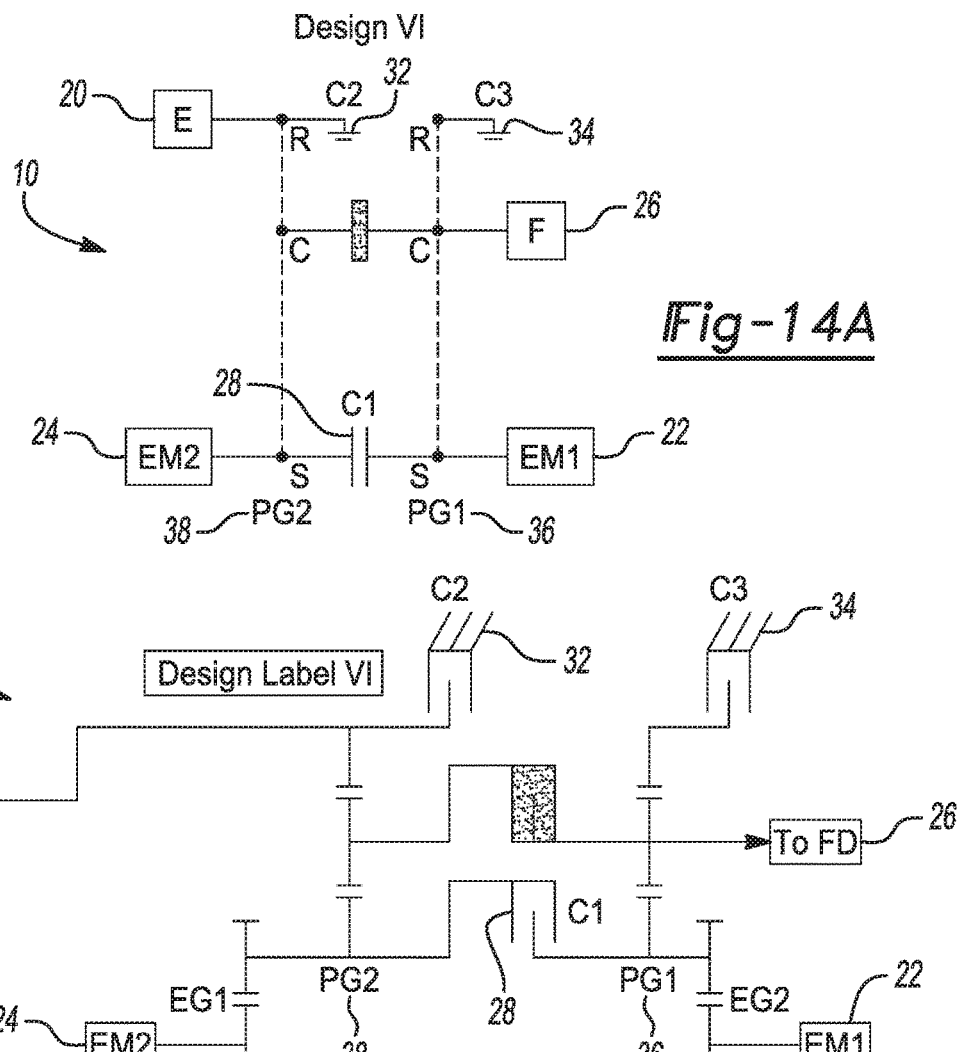
FIGS. 14A-14B are schematic diagrams of a multi-mode, power-split hybrid transmission system according to a sixth embodiment of the present disclosure (Design VI)
FIG. 15 is a table illustrating the operating mode conditions for the sixth embodiment of the present disclosure.

In some embodiments, as illustrated in FIG. 15, multi-mode, power-split hybrid transmission system 10 employs different operating modes that can be selected by engaging or disengaging clutches of first clutch element (C1) 28, second brake/clutch element (C2) 3 and third brake/clutch element (C3) 34. As can be seen, the operating modes available in Design VI are eCVT, EV, parallel hybrid, and power-split (FIG. 15). Attention is directed to FIG. 15 for an illustration of the engaged position (1) and disengaged position (0) of first clutch element (C1) 28, and second brake/clutch element (C2) 32 and third brake/clutch element (C3) 34 and the associated operating mode.

Figure 16:
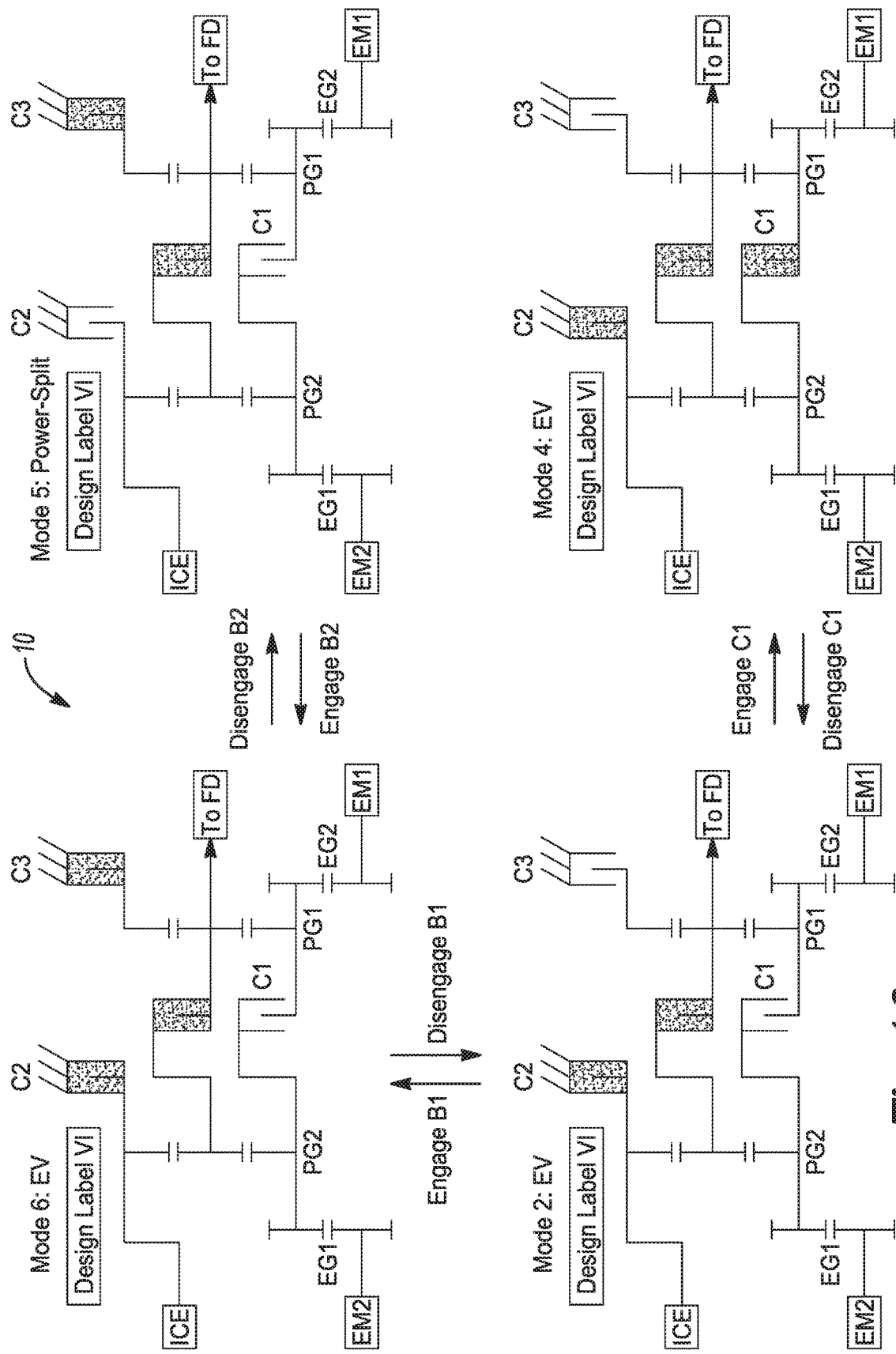
FIG. 16 is an actuation schematic diagram of the multi-mode, power-split hybrid transmission system of FIGS. 14A-14B.

In some embodiments, as illustrated in FIG. 16, the particular operating mode can be selected through the actuation of one or more of the first clutch element (C1) 28, second brake/clutch element (C2) 32, and third brake/clutch element (C3) 34. The actuation paths are illustrated in FIG. 16. The desired operating mode will be selected by a supervisory controller that balances fuel economy, performance, and drivability.

Description of a Seventh Exemplary Embodiment
(Configuration G-Design VII)

Figures 17, 18:
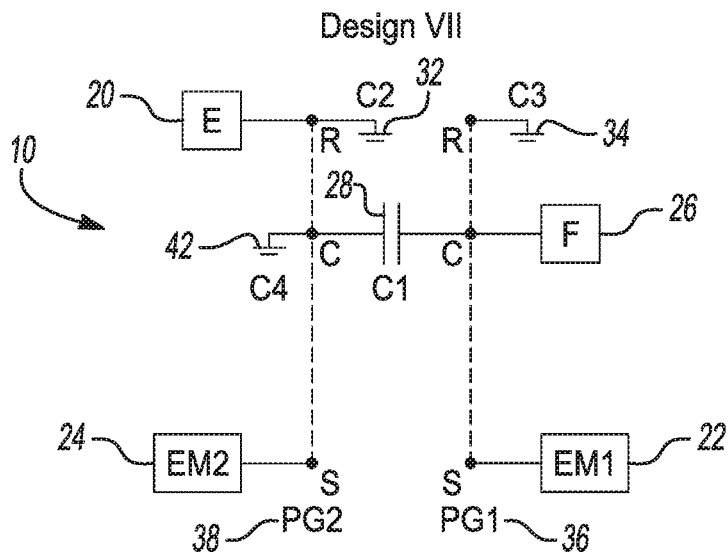
FIG. 17 is a schematic diagram of a multi-mode, power-split hybrid transmission system according to a seventh embodiment of the present disclosure (Design VII)
FIG. 18 is a table illustrating the operating mode conditions for the seventh embodiment of the present disclosure.

In some embodiments, as illustrated in FIG. 17, multi-mode, power-split hybrid transmission system 10 can comprise a variation of the embodiment of FIGS. 14-16, wherein first clutch element (C1) 28 is removed from between the sun gear of the first planetary gear mechanism 36 and the sun gear of the second planetary gear mechanism 38. First clutch element (C1) 28 then replaces the permanent connection between the carrier of the first planetary gear mechanism 36 and the carrier of the second planetary gear mechanism 38. Finally, a fourth brake/clutch element (C4) collocates with the carrier of second planetary gear mechanism 38.

This embodiment can be operated in various modes as illustrated in FIG. 18. That is, the present embodiment employs different operating modes that can be selected by engaging or disengaging first clutch element (C1) 28, second brake/clutch element (C2) 32, third brake/clutch element (C3) 34, and fourth brake/clutch element (C4) 42. As can be seen, the operating modes available in the present embodiment (Design VII) are neutral, parking brake, eCVT, parallel hybrid, series hybrid, EV (low speed, high speed, and power), and power-split (FIG. 18).

Description of an Eighth Exemplary Embodiment
(Configuration H-Design VIII)

Figures 19, 20:
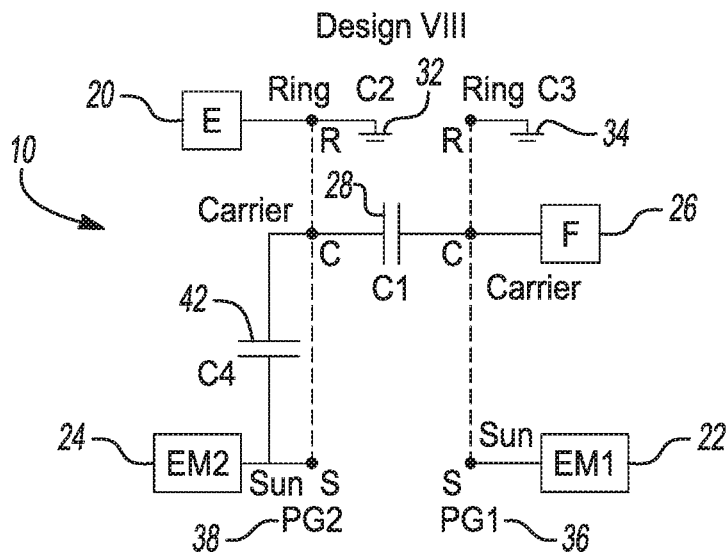
FIG. 19 is a schematic diagram of a multi-mode, power-split hybrid transmission system according to an eighth embodiment of the present disclosure (Design VIII)
FIG. 20 is a table illustrating the operating mode conditions for the eighth embodiment of the present disclosure.

In some embodiments, as illustrated in FIG. 19, multi-mode, power-split hybrid transmission system 10 can comprise a variation of the embodiment of FIGS. 14-16, wherein first clutch element (C1) 28 is removed from between the sun gear of the first planetary gear mechanism 36 and the sun gear of the second planetary gear mechanism 38. First clutch element (C1) 28 then replaces the permanent connection between the carrier of the first planetary gear mechanism 36 and the carrier of the second planetary gear mechanism 38. Finally, a fourth clutch element (C4) 42 collocates with the carrier of second planetary gear mechanism 38 and the sun gear of the second planetary gear mechanism 38.

This embodiment can be operated in various modes as illustrated in FIG. 20. That is, the present embodiment employs different operating modes that can be selected by engaging or disengaging first clutch element (C1) 28, second clutch element (C2) 32, and third brake/clutch element (C3) 34 and fourth clutch element (C4). As can be seen, the operating modes available in the present embodiment (Design VIII) are neutral, parking brake, eCVT, parallel hybrid, series hybrid, EV (low speed, high speed, and power), and power-split (FIG. 20).

Description of a Ninth Exemplary Embodiment
(Configuration E-Design IX)

In some embodiments, as illustrated in FIGS. 21A-21B, multi-mode, power split hybrid transmission system 10 comprises the engine 20 operably connected to the ring gear of the second planetary gear mechanism 28, while first electric motor 22 is connected to the sun gear of the first planetary gear mechanism 36 and second electric motor 24 is connected to the sun gear of the second planetary gear mechanism 38.

The first clutch element (C1) 28 collocates with the ring gear of the first planetary gear mechanism 36 and the ring gear of the second planetary gear mechanism 38. The second clutch element (C2) 30 collocates with the carrier of the first planetary gear mechanism 36 and the sun gear of the second planetary gear mechanism 38. Third brake/clutch element (C3) 32 collocates with the ring gear of the first planetary gear mechanism 36. The carrier of the first planetary gear mechanism 36 is permanently coupled to the carrier of the second planetary gear mechanism 38. The carrier of the first planetary gear mechanism 36 outputs to the final drive 26.

Figure 22:
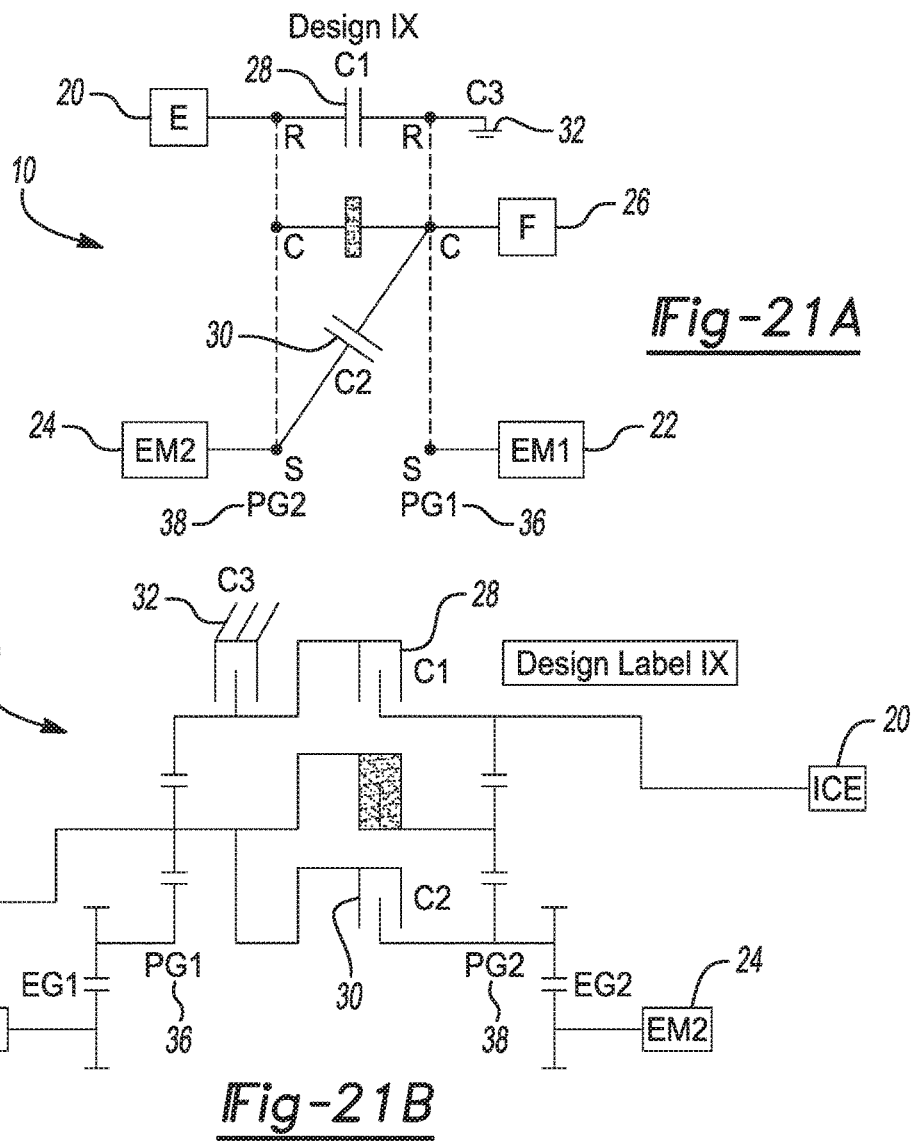
FIG. 22 is a table illustrating the operating mode conditions for the eighth embodiment of the present disclosure.

In some embodiments, as illustrated in FIG. 22, multi-mode, power-split hybrid transmission system 10 employs different operating modes that can be selected by engaging or disengaging clutches of first clutch element (C1) 28 and second clutch element (C2) 30, and third brake/clutch element (C3) 32. As can be seen, the operating modes available in Design IX are eCVT, EV, parallel hybrid, and power-split (FIG. 22). Attention is directed to FIG. 22 for an illustration of the engaged position (1) and disengaged position (0) of first clutch element (C1) 28, second clutch element (C2) 30, and third brake/clutch element (C3) 32 and the associated operating mode.

In some embodiments, as illustrated in FIG. 23, the particular operating mode can be selected through the actuation of one or more of the first clutch element (C1) 28, second clutch element (C2) 30, and third brake/clutch element (C3) 32. The actuation paths are illustrated in FIG. 23. The desired operating mode will be selected by a supervisory controller that balances fuel economy, performance, and drivability.

It should be understood that any of the disclosed embodiments of the present teachings can include exchanging the placement of the first electric motor with the second electric motor. Moreover, the power level of the engine, the first electric motor and the second electric motor can vary based on different implementation purposes. Similarly, the gear ratio of the first planetary gear mechanism and the second planetary gear mechanism can vary based on different implementation purposes. Finally, it should be understood that there can be external gear ratios between the placement of components (the engine, the first electric motor and the second electric motor) and the planetary gear mechanism (first planetary gear mechanism and second planetary gear mechanism) based on different implementation purposes.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A multi-mode, power-split hybrid transmission system comprising:
   an internal combustion engine configured to output driving force;
   a first electric motor configured to output driving force;
   a second electric motor configured to output driving force;
   a first planetary gear mechanism having a carrier, a ring gear, and a sun gear, the first planetary gear mechanism being operably coupled to at least one of the internal combustion engine, the first electric motor, and the second electric motor to transmit driving force;
   a second planetary gear mechanism having a carrier, a ring gear, and a sun gear, the second planetary gear mechanism being operably coupled to at least one of the internal combustion engine, the first electric motor, and the second electric motor to transmit driving force;
   a first dynamic clutch selectively coupling the first planetary gear mechanism to the second planetary gear mechanism; and
   a brake/clutch selectively coupling the ring gear of at least one of the first planetary gear mechanism and the second planetary gear mechanism,
   wherein the multi-mode, power-split hybrid transmission system is configured to operate in a plurality of modes to transmit driving force to a final drive, wherein the engine is operably coupled to the ring gear of the second planetary gear mechanism, the first electric motor is operably coupled to the sun gear of the first planetary gear mechanism, the second electric motor is operably coupled to the sun gear of the second planetary gear mechanism.

2. The multi-mode, power-split hybrid transmission system according to claim 1, wherein the first dynamic clutch collocates with the carrier of the first planetary gear mechanism and the carrier of the second planetary gear mechanism, a second clutch element collocates with the carrier of the second planetary gear mechanism and the sun gear of the second planetary gear mechanism, a third brake/clutch collocates with the ring gear of the first planetary gear mechanism, and the carrier of the first planetary gear mechanism outputs to the final drive.

3. The multi-mode, power-split hybrid transmission system according to claim 2, further comprising a fourth clutch element operably coupled between the engine and the ring gear of the second planetary gear mechanism.

4. The multi-mode, power-split hybrid transmission system according to claim 1, wherein the first dynamic clutch collocates with the sun gear of the first planetary gear mechanism and the sun gear of the second planetary gear mechanism, a second clutch element collocates with the carrier of the first planetary gear mechanism and the carrier gear of the second planetary gear mechanism, a third brake/clutch collocates with the ring gear of the first planetary gear mechanism, and the carrier of the first planetary gear mechanism outputs to the final drive.

5. The multi-mode, power-split hybrid transmission system according to claim 4, wherein a fourth brake/clutch element operably coupled with the carrier of the second planetary gear mechanism.

6. A multi-mode, power-split hybrid transmission system comprising:
   an internal combustion engine configured to output driving force;
   a first electric motor configured to output driving force;
   a second electric motor configured to output driving force;
   a first planetary gear mechanism having a carrier, a ring gear, and a sun gear, the first planetary gear mechanism being operably coupled to at least one of the internal combustion engine, the first electric motor, and the second electric motor to transmit driving force;
   a second planetary gear mechanism having a carrier, a ring gear, and a sun gear, the second planetary gear mechanism being operably coupled to at least one of the internal combustion engine, the first electric motor, and the second electric motor to transmit driving force;
   a first dynamic clutch selectively coupling the first planetary gear mechanism to the second planetary gear mechanism; and
   a brake/clutch selectively coupling the ring gear of at least one of the first planetary gear mechanism and the second planetary gear mechanism,
   wherein the multi-mode, power-split hybrid transmission system is configured to operate in a plurality of modes to transmit driving force to a final drive, wherein the first dynamic clutch collocates with the ring gear of the first planetary gear mechanism and the ring gear of the second planetary gear mechanism, a second clutch element collocates with the sun of the first planetary gear mechanism and the sun gear of the second planetary gear mechanism, a third brake/clutch collocates with the ring gear of the first planetary gear mechanism, and the carrier of the first planetary gear mechanism is permanently coupled to the carrier of the second planetary gear mechanism and outputs to the final drive.

7. The multi-mode, power-split hybrid transmission system according to claim 1, wherein the first dynamic clutch collocates with the sun gear of the first planetary gear mechanism and the sun gear of the second planetary gear mechanism, a second brake/clutch collocates with the ring gear of the second planetary gear mechanism, a third brake/clutch collocates the ring gear of the first planetary gear mechanism, and the carrier of the first planetary gear mechanism is permanently coupled to the carrier of the second planetary gear mechanism and outputs to the final drive.

8. The multi-mode, power-split hybrid transmission system according to claim 1, wherein the first dynamic clutch collocates with the carrier of the first planetary gear mechanism and the carrier of the second planetary gear mechanism, a second brake/clutch element collocates with the ring gear of the second planetary gear mechanism, a third brake/clutch element collocates the ring gear of the first planetary gear mechanism, a fourth brake/clutch element collocates the carrier of the second planetary gear mechanism, and the carrier of the first planetary gear mechanism outputs to the final drive.

9. The multi-mode, power-split hybrid transmission system according to claim 1, wherein the first dynamic clutch collocates with the carrier of the first planetary gear mechanism and the carrier of the second planetary gear mechanism, a second brake/clutch element collocates with the ring gear of the second planetary gear mechanism, a third brake/clutch element collocates with the ring gear of the first planetary gear mechanism, and a fourth clutch collocates with the carrier of the second planetary gear mechanism and the sun gear of the second planetary gear mechanism, and the carrier of the first planetary gear mechanism outputs to the final drive.

10. The multi-mode, power-split hybrid transmission system according to claim 1, wherein the first dynamic clutch collocates with the ring gear of the first planetary gear mechanism and the ring gear of the second planetary gear mechanism, a second clutch collocates with the carrier of the first planetary gear mechanism and the sun gear of the second planetary gear mechanism, a third brake/clutch element collocates with the ring gear of the first planetary gear mechanism, and the carrier of the first planetary gear mechanism is permanently coupled to the carrier of the second planetary gear mechanism and outputs to the final drive.

* * * * *